(12) United States Patent
Wang et al.

(10) Patent No.: US 11,163,722 B2
(45) Date of Patent: Nov. 2, 2021

(54) METHODS AND APPARATUS FOR ANALYZING A LIVE STREAM OF LOG ENTRIES TO DETECT PATTERNS

(71) Applicant: salesforce.com, inc., San Francisco, CA (US)

(72) Inventors: Chi Wang, Redmond, WA (US); Edet Nkposong, Mercer Island, WA (US); Benjamin Mackenzie Caldwell, Waterloo (CA)

(73) Assignee: salesforce.com, inc., San Francisco, CA (US)

( * ) Notice: Subject to any disclaimer, the term of this patent is extended or adjusted under 35 U.S.C. 154(b) by 609 days.

(21) Appl. No.: 15/885,675

(22) Filed: Jan. 31, 2018

(65) Prior Publication Data

US 2019/0236160 A1 Aug. 1, 2019

(51) Int. Cl.
*G06F 16/11* (2019.01)
*G06F 16/35* (2019.01)

(52) U.S. Cl.
CPC .......... *G06F 16/128* (2019.01); *G06F 16/358* (2019.01)

(58) Field of Classification Search
None
See application file for complete search history.

(56) References Cited

U.S. PATENT DOCUMENTS

| | | | |
|---|---|---|---|
| 7,730,478 B2 | 6/2010 | Weissman | |
| 2014/0096249 A1* | 4/2014 | Dupont | G06F 21/552 726/23 |
| 2015/0142745 A1* | 5/2015 | Tekade | G06F 11/1464 707/646 |
| 2017/0063905 A1* | 3/2017 | Muddu | G06F 16/9024 |
| 2017/0236023 A1* | 8/2017 | Debnath | G06F 17/40 707/737 |
| 2019/0220314 A1 | 7/2019 | Borra et al. | |
| 2019/0238403 A1 | 8/2019 | Wang et al. | |
| 2019/0238456 A1 | 8/2019 | Wang et al. | |

OTHER PUBLICATIONS

Amazon Web Services, "Streaming Data Solutions on AWS with Amazon Kinesis," Jul. 2017, 29 pages.

(Continued)

*Primary Examiner* — Aleksandr Kerzhner
*Assistant Examiner* — Eddy Cheung
(74) *Attorney, Agent, or Firm* — Nicholson, De Vos, Webster & Elliott, LLP

(57) ABSTRACT

A method is implemented by a computing device to analyze a live stream of log entries to determine new patterns and changes in a number of occurrences of previously identified patterns. The method includes receiving a log entry in a live stream of log entries, determining whether the log entry fits a baseline pattern from one or more previously saved baseline patterns, adding to a count of occurrences for a baseline pattern if the log entry fits that baseline pattern, creating a new baseline pattern for the log entry if the log entry does not fit any of the one or more previously saved baseline patterns, saving the new baseline pattern, generating a snapshot of a pattern hierarchy based on the baseline patterns, comparing the new snapshot to a previously saved snapshot of a pattern hierarchy, and causing a report to be displayed based on a result of the comparing.

16 Claims, 12 Drawing Sheets

(56) References Cited

OTHER PUBLICATIONS

Ankerst, et al., "OPTICS: Ordering Points to Identify the Clustering Structure," 1999, SIGMOD '99, ACM, pp. 49-60.
Blanas, et al., "A Comparison of Join Algorithms for Log Processing in MapReduce," SIGMOD 2010, ACM, Jun. 6-11, 2010, 12 pages.
Ding, et al., "Log-based Indexing to Improve Web Site Search," ACM, SAC'07, Mar. 11-15, 2007, pp. 829-833.
Eltahir, et al., "Extracting Knowledge from Web Server Logs Using Web Usage Mining," 2013 International Conference on Computing, Electrical and Electronics Engineering {ICCEEE), IEEE, Aug. 2013, pp. 413-417.
Faloutsos, et al., "Fast Subsequence Matching in Time-Series Databases," SIGMOD 1994, ACM, May 1994, vol. 23, pp. 419-429.
Hamooni, et al., "LogMine: Fast Pattern Recognition for Log Analytics," CIKM'16, Oct. 24-28, 2016, 10 pages.
Jackson, B., "Top 10+ Log Analysis Tools—Making Data-Driven Decisions," proinity LLC, updated Oct. 3, 2017, downloaded from https://www.keycdn.com/blog/log-analysis-tools/ on Jan. 31, 2018, 16 pages.
Keogh, et al., "On the Need for Time Series Data Mining Benchmarks: A Survey and Empirical Demonstration," Data Mining and Knowledge Discovery, Oct. 2003, vol. 7, Issue 4, pp. 349-371.
"Benchmarking," ELKI Data Mining, elki-project on GitHub, downloaded from http://elki.dbs.ifi.lmu.de/wiki/Benchmarking on Jan. 31, 2018, 4 pages.
"EPA-HTTP—a Day of HTTP Logs from the EPA WWW Server," The Internet Traffic Archive, downloaded from http://ita.ee.lbl.gov/html/contrib/EPA-HTTP.html on Jan. 31, 2018, 1 page.
"SDSC-HTTP—a Day of HTTP Logs from the SDSC WWW Server," The Internet Traffic Archive, downloaded from http://ita.ee.lbl.gov/html/contrib/SDSC-HTTP.html on Jan. 31, 2018, 1 page.
Lee, et al., "Parallel Data Processing with MapReduce: A Survey," SIGMOD Record, ACM, vol. 40 (4), Dec. 2011, pp. 11-20.
Lee, et al., "The Unified Logging Infrastructure for Data Analytics at Twitter," Proceedings of the VLDB Endowment, vol. 5 (12), Aug. 27-31, 2012, pp. 1771-1780.
ManageEngine, "Syslog & Windows Event Log Analysis," EventLog Analyzer, downloaded from https://www.manageengine.com/products/eventlog/eventlog-analysis.html on Jan. 31, 2018, 3 pages.
Mueen, et al., "Exact Discovery of Time Series Motifs," 2009 SIAM International Conference on Data Mining, Apr. 30-May 2, 2009, pp. 474-484.
Ning, et al., "HLAer: a System for Heterogeneous Log Analysis," SDM Workshop on Heterogeneous Learning, Apr. 2014, 22 pages.
Rajachandrasekar, et al, "Monitoring and Predicting Hardware Failures in HPC clusters with FTB-IPMI," 2012 IEEE 26th International Parallel and Distributed Processing Symposium Workshops & PhD Forum (IPDPSW), May 21-25, 2012, 8 pages.
Rakthanmanon, et al., "Searching and Mining Trillions of Time Series Subsequences under Dynamic Time Warping," KDD'12, ACM, Aug. 2012, 9 pages.
Reddy, et al., "Preprocessing the Web Server Logs—An illustrative approach for effective usage mining," ACM SIGSOFT Software Engineering Notes, vol. 37, Issue 3, May 2012, pp. 1-5.
Rouillard, J., "Real-time Log File Analysis Using the Simple Event Correlator (SEC)," 2004 LISA XVIII, Nov. 2004, pp. 133-150.
Smith, et al., "Identification of Common Molecular Subsequences," Journal of Molecular Biology, vol. 147, Issue 1, Mar. 1981, pp. 195-197.
Sneath, et al., Numerical Taxonomy, Chapter 5, "Taxonomic Structure," 1973 W. H. Freeman and Company, pp. 230-234. http://www.brclasssoc.org.uk/books/Sneath/.
Wikipedia, "DBSCAN," last edited Jan. 16, 2018, downloaded from https://en.wikipedia.org/w/index.php?title=DBSCAN&oldid=672504091 on Jan. 31, 2018, 6 pages.
Wikipedia, "OpenStack," last edited Jan. 26, 2018, downloaded from https://en.wikipedia.org/wiki/OpenStack on Jan. 31, 2018, 18 pages.
Wikipedia, "OSSIM," Open Source Security Information Management, last edited Jul. 17, 2017, downloaded from https://en.wikipedia.org/wiki/OSSIM on Jan. 31, 2018, 4 pages.
Xu, et al., "Network User Interest Pattern Mining Based on Entropy Clustering Algorithm," 2015 International Conference on Cyber-Enabled Distributed Computing and Knowledge Discovery (CyberC), Sep. 2015, 5 pages.
Zaharia, et al., "Spark: Cluster Computing with Working Sets," HotCloud'10 Proceedings of the 2nd USENIX Conference on Hot topics in Cloud Computing, Jun. 2010, 7 pages.

\* cited by examiner

| # | Log Pattern | Parent | Timestamp | Timestamp (Year) | Timestamp (Quarter) | Level | Count |
|---|---|---|---|---|---|---|---|
| 1 | ERROR * | * | 8/24/2017 | 2017 | 3 | 5 | 121 |
| 2 | event.id=# * SN device.port_number=# * | * | 8/24/2017 | 2017 | 3 | 5 | 2 |
| 3 | DEBUG BaseAccessor event.id=#event.typ... | event.id=# * SN device.port_number=# * | 8/24/2017 | 2017 | 3 | 1 | 2 |

Fig. 5

METHODS AND APPARATUS FOR ANALYZING A LIVE STREAM OF LOG ENTRIES TO DETECT PATTERNS

TECHNICAL FIELD

One or more implementations relate to the field of analyzing log entries, and more specifically, to analyzing a live stream of log entries generated by a system to detect new patterns and/or trends of previously identified patterns in the live stream of log entries.

BACKGROUND ART

With the increasing popularity of cloud computing services, datacenters are growing rapidly. More computing devices and network devices are constantly being added to datacenter infrastructures to meet the growing needs of customers. Maintaining and troubleshooting the datacenter becomes increasingly complex as the datacenter grows, especially when different types of hardware are being added to the datacenter with different types of software running on top of the underlying hardware.

One solution to deal with maintaining and troubleshooting a rapidly growing datacenter is simply to hire or train more staff that have the necessary hardware knowledge. However, this solution is costly and does not scale. Another solution is to analyze log files generated by the datacenter to identify potential problems. The log files can be analyzed using a log aggregation algorithm or a machine-learning clustering algorithm. However, these algorithms are disadvantageous in that they can only process static datasets or require converting live data into batches. Also, these algorithms are slow and computationally expensive because they require scanning the whole dataset twice, which makes it difficult to handle live streaming data. Also, these algorithms do not leverage previous results when processing new incremental data, but require re-running the algorithm on the entire dataset each time new data is received, which can be computationally expensive when processing live streaming data. Also, it is difficult to compare the results of these algorithms performed at different times because the baseline can change with each computation.

BRIEF DESCRIPTION OF THE DRAWINGS

The following figures use like reference numbers to refer to like elements. Although the following figures depict various exemplary implementations, alternative implementations are within the spirit and scope of the appended claims. In the drawings:

FIG. 5 is a diagram illustrating a report, according to some implementations.

DETAILED DESCRIPTION

Figure 1:
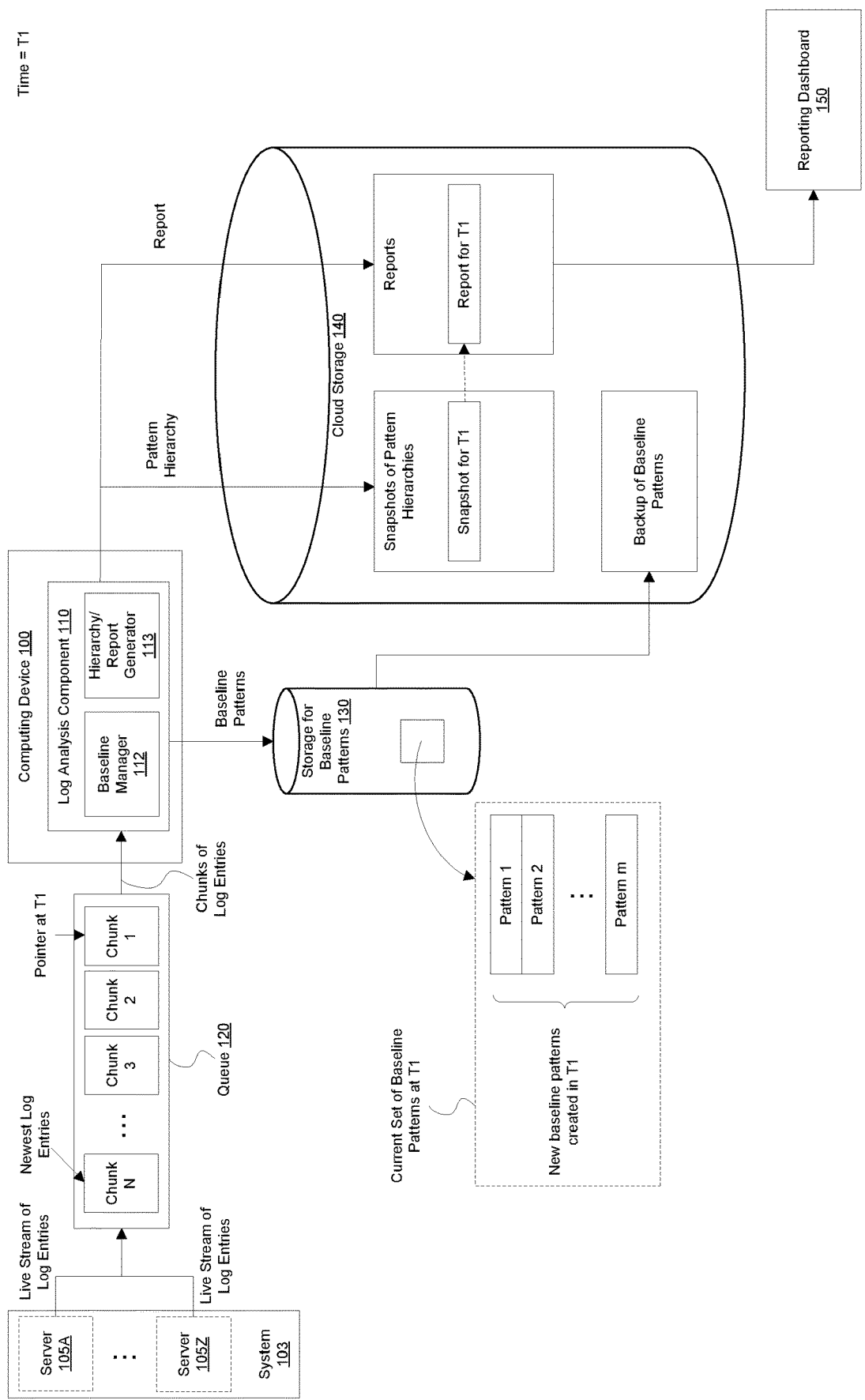
FIG. 1 is a block diagram of a system for analyzing a live stream of log entries at time T1, according to some implementations.

The following description describes methods and apparatus for analyzing a live stream of log entries (or other types of structured data) to detect the emergence of new patterns and/or to detect changes in the number of occurrences of previously identified patterns (also referred to as trends). For example, computing devices generate large amounts of log entries to report their status. It is important to be able to analyze these log entries and present usable information (e.g., patterns) to administrators/users so that they can maintain and troubleshoot these computing devices. Patterns minimally represent a group of log messages and enable the administrators/users to perform further analysis, such as anomaly detection and event prediction. Although patterns typically exist in automated log messages, it is difficult to recognize these patterns in a massive set of log entries generated by heterogenous sources without any prior information.

One technique for analyzing log messages takes a large batch of log entries as input and clusters them quickly with restrictive constraints using a clustering module. A pattern is then generated for each cluster by a pattern recognition module. These patterns form the leaf level of a pattern hierarchy. The technique continues to generate clusters with more relaxed constraints in subsequent iterations and merges the clusters to form more general patterns, which form a new parent level in the pattern hierarchy. The technique continues to iterate until the most general pattern has been achieved and/or the hierarchy of patterns is completely formed. The technique is unsupervised in that it does not assume any input from the administrator. Also, the technique produces a hierarchy of patterns, which is interpretable to the administrator. The technique does not assume any property in the sources of the log entries. Such technique is described in the paper titled, "LogMine: Fast Pattern Recognition for Log Analytics" by Hamooni, et al. published in CIKM '16 Proceedings of the 25th ACM International Conference on Information and Knowledge Management, Pages 1573-1582, which is incorporated herein by reference.

A disadvantage of this technique, however, is that it can only operate on entire log files or batches of log entries, and thus is not adapted to incrementally process a live stream of log entries in real time. While the technique can be reapplied every time a log entry is received, this is computationally expensive (it requires a significant amount of re-computation). Also, the patterns can change each time the technique is reapplied, which makes it difficult to compare the results of different runs.

Implementations described herein improve upon the technique described above by extending it so that it can incrementally process log entries in a live stream of log entries without having to perform a significant amount of re-computation. Also, implementations allow the results generated at different times to be comparable, which allows for the detection of new patterns and trends in the previously identified patterns over time.

According to some implementations, a computing device receives a log entry in a live stream of log entries and determines whether the log entry fits a baseline pattern from one or more previously saved baseline patterns. If the log entry fits the baseline pattern, the computing device adds to a count of occurrences for the baseline pattern. If the log entry does not fit any of the one or more previously saved baseline patterns, then the computing device creates a new baseline pattern for the log entry and saves the new baseline pattern. The computing device then generates a new snapshot of a pattern hierarchy based on the baseline patterns and compares the new snapshot to a previously saved snapshot of a pattern hierarchy. The computing device then causes the display of a report based on a result of the comparing.

According to some implementations, a computing device maintains over time a current set of baseline patterns responsive to a live stream of log entries by appending to the current set of baseline patterns rather than regenerating the current set of baseline patterns. The computing device performs the following such that it occurs at different times rather than maintaining or regenerating a pattern hierarchy each time there is a change in the current set of baseline patterns and/or there are new log entries: 1) generate a current pattern hierarchy based on the current set of baseline patterns at that time; 2) add a current snapshot of the current pattern hierarchy to a current set of snapshots collected at that time; 3) compare the current snapshot and one or more other snapshots in the current set of snapshots at that time to detect new baseline patterns and/or detect trends of previously identified baseline patterns in the live stream of log entries; and 4) cause the display of a report based on a result of the comparing.

FIG. 1 is a block diagram of a system for analyzing a live stream of log entries and detecting new patterns and/or trends of previously identified patterns in the live stream of log entries, according to some implementations. As shown in the diagram, the overall system includes a system 103 (e.g., one or more servers 105A-Z), a queue 120, a computing device 100, storage/cache 130 (for storing baseline patterns), cloud storage 140, and reporting dashboard 150. The system 103 (e.g., the servers 105) generates a live stream of log entries (the log entries are incrementally generated in real-time). In one implementation, the servers 105 are part of a datacenter that provides cloud computing services and the log entries are indicative of failures in the datacenter. The log entries are grouped into chunks and placed in the queue 120. As shown in the diagram, the queue 120 includes N chunks, where each chunk includes a group of log entries. The chunks are to be processed from the queue 120 in a First In First Out (FIFO) order. As shown in the diagram, chunk 1 is the oldest chunk and is at the front of the queue 120, while chunk N is the newest chunk and is at the back of the queue 120.

The computing device 100 includes a log analysis component 110. The log analysis component includes a baseline manager 112 and a hierarchy/report generator 113. As will be further described herein below, the baseline manager 112 maintains a current set of baseline patterns and the hierarchy/report generator 113 generates snapshots of pattern hierarchies and/or reports. While the baseline manager 112 and hierarchy/report generator 113 are shown as being implemented on the same computing device 100, in other implementations, the baseline manager 112 and the hierarchy/report generator can be implemented on separate computing devices. That is, the functionality of the log analysis component 110 can be implemented in a distributive manner. In one implementation, the baseline manager 112 of the log analysis component 110 processes chunks of log entries from the queue 120 in FIFO order. In one implementation, the baseline manager 112 tokenizes and sanitizes the log entries before further analyzing them. In one implementation, log entries are tokenized by using white-space separation. In one implementation, the log entries are sanitized by detecting fields in the log entries that have a pre-defined type/format such as date, time, Internet Protocol (IP) address, and number. The actual values in these fields are replaced with the type designation for that field. For example, "2015-07-09" can be replaced with "date" and "192.168.10.15" can be replaced with "IP." The types can be pre-defined by the user based on which types of data the user is interested in. Tokenizing and sanitizing (with type detection) the data in this manner allows the comparisons between log entries to be more meaningful. If log entries are not tokenized and sanitized, then two log entries having the same/similar pattern might be determined to have low similarity just because they have different values for the same field. Examples of log entries before and after they are tokenized/sanitized are shown below.

Before Tokenization and Type Detection:
2014-07-09 20:32 INFO http recommended=12523 actual=14235
2014-07-12 05:21 INFO https source=192.168.32.10
After Tokenization and Type Detection:
date time INFO http recommended=number actual=number
date time INFO https source=IP The baseline manager 112 maintains a current set of (previously seen/saved) baseline patterns in storage 130. While the diagram shows the baseline patterns being saved in storage 130 that is separate from the cloud storage (e.g., to provide faster access), in other implementations, the current set of baseline patterns can be saved in cloud storage 140. As used herein, a baseline pattern refers to a pattern that is generated from performing a clustering algorithm and pattern recognition algorithm directly on log entries in the live stream of log entries. The baseline manager 112 incrementally processes log entries in the live stream of log entries. For each new log entry in the live stream of log entries, the baseline manager 112 determines whether that log entry fits a baseline pattern from any previously saved baseline patterns (e.g., in storage 130). If the log entry fits a previously saved baseline pattern, then the baseline manager 112 adds to a count of occurrences for that baseline pattern. Otherwise, if the log entry does not fit any of the previously saved baseline patterns, then the baseline manager 112 creates a new baseline pattern for that log entry and saves the newly created baseline pattern (e.g., in storage 130, along with the previously saved baseline patterns). In one implementation, the count of occurrences for a baseline pattern can be saved/maintained in storage 130 with that baseline pattern. As used herein, a log entry is said to "fit" a baseline pattern if the log entry conforms to the baseline pattern. As will be further described herein below, in one implementation, the baseline manager 112 determines whether a log entry fits a baseline pattern based on whether the output of a distance function between the log entry and a representative of the baseline pattern is less than or equal to a threshold. Thus, the baseline manager 112 maintains, over time, a current set of baseline patterns that reflects the live stream of log entries by maintaining a count of occurrences for each of the baseline patterns (e.g., by adding to the count of occurrences for a previously saved baseline pattern if a log entry fits a previously saved baseline pattern) and/or adding a newly identified baseline pattern (e.g., by creating and saving a new baseline pattern if a log entry does not fit any of the previously saved baseline patterns). Maintaining the current set of baseline patterns in this fashion allows log entries to be processed incrementally without having to regenerate the baseline patterns each time a new log entry is received, as is conventionally done. This makes it particularly suitable for processing a live stream of log entries, where log entries are incrementally generated in real-time. Also, as will be further described herein below, maintaining the current set of baseline patterns in this fashion allows for the ability to compare baseline patterns over time to detect, for example, the emergence of new patterns and/or trends in previously identified baseline patterns. In one implementation, the baseline manager 112 backs up the baseline patterns (e.g., periodically or on-demand) in the cloud storage 140 to allow recovery from data loss. The cloud storage 140 provides storage that can be accessible over a network (e.g., a Local Area Network (LAN) and/or the internet).

A clustering algorithm can be used to cluster log entries that are similar. Exemplary pseudocode for a clustering algorithm that uses a map-reduce approach is provided below:

```
Input: Two tuples A = (1, List₁), B = (1, List₂)
Output: A tuple
if size(List₁) >= size(List₂) then
    Base_list ← List₁
    Small list ← List₂
else if size(List₁) < size(List₂) then
    Base_list ← List₂
    Small_list ← List₁
for i = 1, ..., size(Small_list) do
    Found=False
    for j = 1, ..., size(Base_list) do
        if d(Small_list(i), Base_list(j)) <= MaxDist then
            Found=True
            break
    if Found then
        Append Small list(i) in the Base_list
return (1, Base_list)
```

In the pseudocode, function d represents a distance function and MaxDist represents the maximum distance between a log entry in a cluster and the cluster representative. Thus, the maximum distance between any two logs in a cluster is 2×MaxDist. Each cluster has a representative log entry, which is also the first member of the cluster. For any new log entry, the log entry is inserted in one of the existing clusters only if the distance between the log entry and the cluster representative is less than MaxDist. Otherwise, a new cluster is created and the log entry is the representative of that new cluster. In one implementation, the technique described above or a similar technique (e.g., using distance function d and MaxDist parameter) can be used by the baseline manager 112 to determine whether a log entry fits a previously saved baseline pattern and/or to create a new baseline pattern for a log entry.

A pattern recognition algorithm can be used to generate a pattern for a cluster of log entries. Exemplary pseudocode for a pattern recognition algorithm is provided below:

```
Input: Two log entries (Logₐ; Log_b)
Output: A merged log entry
Logₐ' , Log_b' ← Align(Logₐ, Log_b)
for i, i = 2, 3, ..., | Logₐ'| do
    x ← Fieldᵢ(Logₐ') and y ← Fieldᵢ(Log_b')
    if x = y then
        Fieldᵢ(Log_new) ← x
    else if Type(x) = Type(y) then
        Fieldᵢ(Log_new) ← Variable_Type(x)
    else
        Fieldᵢ(Log_new) ← Wildcard
return Log_new
```

In the pseudocode, two log entries are first aligned. The best alignment of two log entries is one that generates the minimum number of wildcards and variables after merging. In the alignment process (Align function), some gaps may be inserted between the fields of each log. The alignment algorithm ensures that the length of two log entries are equal after inserting the gaps. Once the two log entries have the same length, they can be processed field by field to generate the output. In one implementation the Align function uses the Smith-Waterman algorithm. The pseudocode above generates a pattern for two log entries. To generate a pattern for a cluster of more than two log entries, the first log entry can be merged with the second log entry, then the result can be merged with the third log entry and so on until the last log entry is reached. In one implementation, the technique described above or a similar technique (e.g., using merging) can be used by the baseline manager 112 to generate a baseline pattern.

Figure 3:
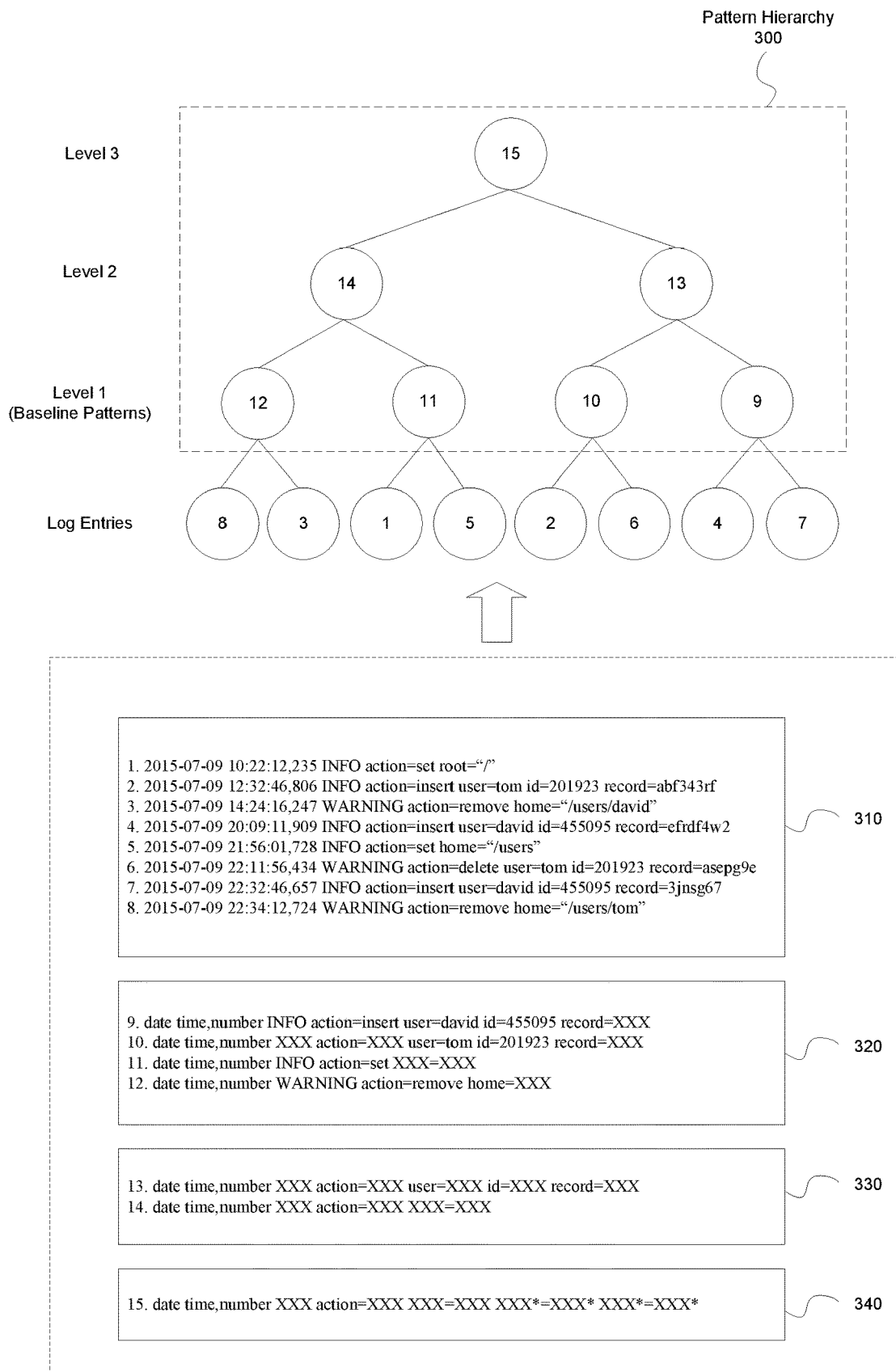
FIG. 3 is a diagram illustrating a pattern hierarchy represented in a tree format, according to some implementations.

In one implementation, the hierarchy/report generator 113 generates a pattern hierarchy (e.g., on demand or periodically) based on the current set of baseline patterns at that time. As used herein, a pattern hierarchy refers to a hierarchy of patterns that includes multiple levels of one or more patterns. Pattern(s) in a higher level in the hierarchy are more generalized than patterns in a lower level in the hierarchy (the patterns in a higher level encompass one or more patterns in a lower level). In one implementation, the baseline patterns form the lowest level of the pattern hierarchy. The patterns in the next higher level of the pattern hierarchy can be generated based on the baseline patterns. The patterns in the next higher level of the pattern hierarchy can be generated based on the patterns in the level immediately below that level and so on until the most general pattern is generated. As shown in FIG. 3 and will be further described herein below, a pattern hierarchy can be represented in a tree format. As illustrated, baseline management has been separated from pattern hierarchy generation so that the pattern hierarchy generation may be performed at different times rather than maintaining or regenerating a pattern hierarchy each time there is a change in the current set of baseline patterns and/or there are new log entries. Different implementations may support one or more types of trigger(s) that may each cause the generation of a pattern hierarchy (e.g., on-demand (e.g., based on receiving a request from an administrator/user), periodically (e.g., everyday), responsive to one or more conditions (e.g., a number of entries having been received since the last hierarchy was generated), etc.). The pattern hierarchy generated responsive to such a trigger is based on the current set of baseline patterns at that time. A pattern hierarchy generated for a specific timepoint is referred to herein as a snapshot of a pattern hierarchy or simply as a snapshot. The hierarchy/report generator 113 may store snapshots of pattern hierarchies for different timepoints in the cloud storage 140.

In one implementation, the hierarchy/report generator 113 generates the pattern hierarchy in a bottom-up manner by iteratively running a clustering algorithm and a pattern recognition algorithm. The baseline patterns form the lowest level of the pattern hierarchy. To generate the higher levels of the pattern hierarchy, the MaxDist parameter can be increased by a factor and the clustering algorithm can be run on the baseline patterns. Stated differently, a more relaxed version of the clustering algorithm can be run on the baseline patterns, which will produce new clusters. The pattern recognition algorithm can be run on the patterns that are clustered together to find more general patterns. These set of new patterns are added to the pattern hierarchy as a new level. In each iteration, a new level is added to the pattern hierarchy, where patterns that are in a higher level of the pattern hierarchy are more general than patterns that are in a lower level of the pattern hierarchy.

Figure 2:
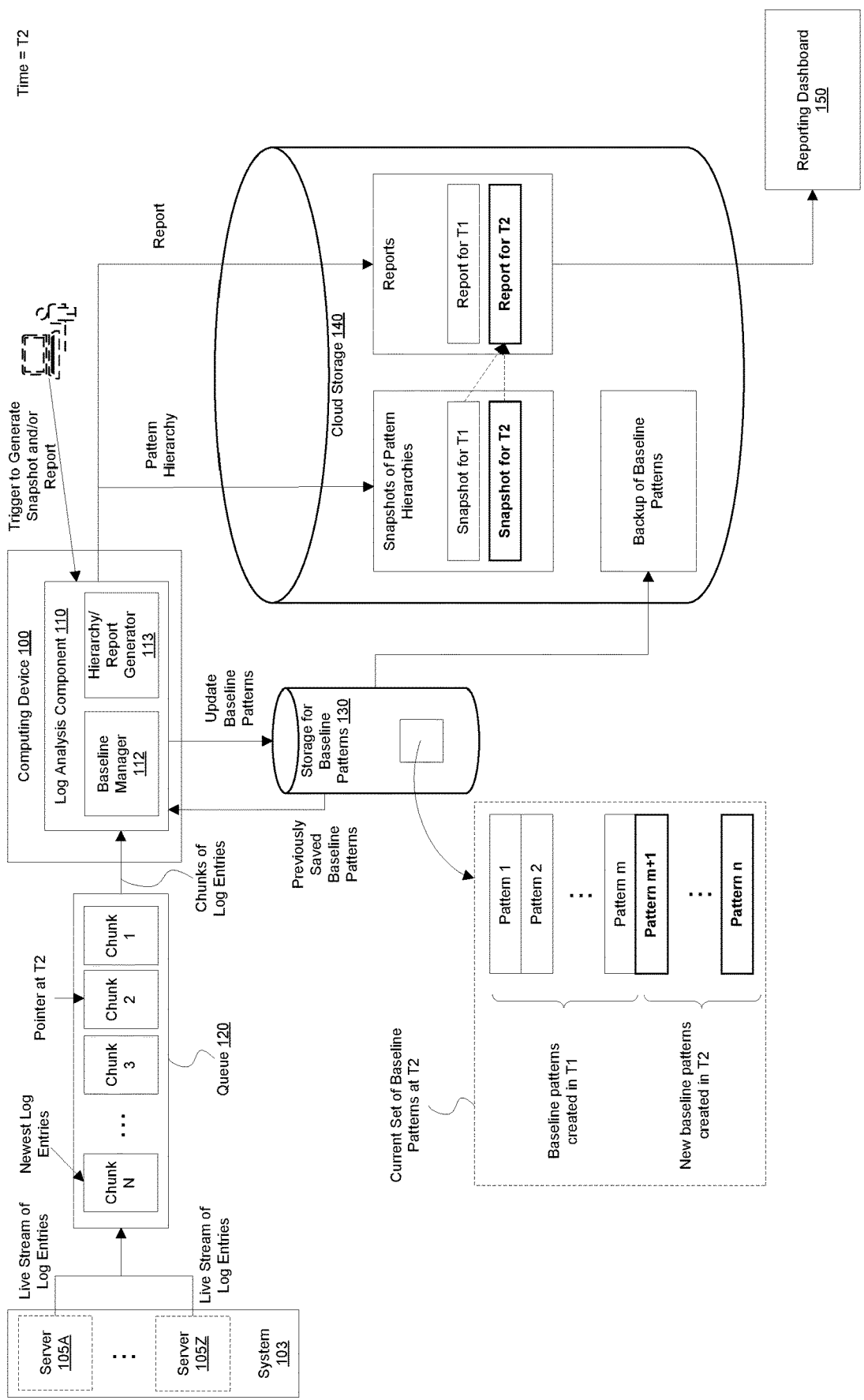
FIG. 2 is a block diagram of the system of FIG. 1 at time T2, according to some implementations.

As described in more detail in relation to FIG. 2, In one implementation, the hierarchy/report generator 113 compares a new snapshot with a previously saved snapshot and generates a report based on the result of the comparison. In one implementation, the comparison involves determining new baseline patterns that appear in the new snapshot but not in the previously saved snapshot. Additionally or alternatively, in one implementation, the comparison involves determining a difference in the count of occurrences for a given baseline pattern between the new snapshot and the previously saved snapshot. The comparison between snapshots is possible because they are generated from a common baseline (e.g., the new snapshot will include all of the baseline patterns of the previously saved snapshot and possibly one or more additional baseline patterns). In one implementation, the report includes an indication of the new baseline patterns that appear in the new snapshot but not in the previously saved snapshot and/or the difference in the count of occurrences for a given baseline pattern between the new snapshot and the previously saved snapshot. In one implementation, the report includes an indication of which baseline patterns have the highest and/or lowest count of occurrences. In one implementation, the report is in a comma-separated values (CSV) format or other format that can be easily parsed. The hierarchy/report generator 113 may store the generated report in the cloud storage 140. In one implementation, the reporting dashboard 150 takes a report and displays the contents of the report (e.g., as a website). In one implementation, an alert can be generated when a suspicious trend or new pattern is detected.

Exemplary operations of the system are now described. FIG. 1 shows a state of the system at time T1 and FIG. 2 shows a state of the system at time T2. At time T1, the pointer for the queue 120 is pointing to chunk 1, which indicates that chunk 1 is the next chunk to be processed. For each log entry in chunk 1, the baseline manager 112 determines whether that log entry fits a baseline pattern from the previously saved baseline patterns (if any). For those log entries that fit a previously saved baseline pattern, the baseline manager 112 adds to the count of occurrences for the corresponding baseline pattern. For those log entries that do not fit any of the previously saved baseline patterns, the baseline manager 112 creates new baseline patterns. In this example, since these are the first log entries being processed, there are no previously saved baseline patterns so at least one new baseline pattern will be created. In this example, the baseline manager 112 creates baseline patterns 1, 2, . . . , and m and saves these baseline patterns in storage 130. These patterns comprise the current set of baseline patterns at time T1. In one implementation, the hierarchy/report generator 113 generates a snapshot of a pattern hierarchy for time T1 based on the current set of baseline patterns at that time (baseline patterns 1, 2, . . . , and m), and stores this snapshot in the cloud storage 140. In one implementation, the hierarchy/report generator 113 may also generate a report for time T1 based on this snapshot (e.g., as indicated by the dashed line from the snapshot for times T1 to the report for time T1).

Now referring to FIG. 2, at time T2, the pointer for the queue 120 is pointing to chunk 2 (since chunk 1 has been processed). For each log entry in chunk 2, the baseline manager 112 determines whether that log entry fits a baseline pattern from the previously saved baseline patterns (e.g., those created in time T1 or earlier). For those log entries that fit a previously saved baseline pattern, the baseline manager 112 adds to the count of occurrences for the corresponding baseline pattern. For those log entries that do not fit any of the previously saved baseline patterns, the baseline manager 112 creates new baseline patterns. As a result, in this example, the baseline manager 112 creates baseline patterns m+1, . . . , and n and saves these baseline patterns in storage 130. As a result, the storage 130 now stores baseline patterns 1 to m (created in T1) and baseline patterns m+1 to n (created in T2). These patterns comprise the current set of baseline patterns at time T2. It should be noted that while, in this example, new baseline patterns are created, in some cases there might be no new patterns created (just updates to the count of occurrences for existing baseline patterns). In one implementation, the hierarchy/report generator 113 generates a snapshot of a pattern hierarchy for time T2 based on the current set of baseline patterns at that time (baseline patterns 1, 2, . . . , m+1, . . . , n), and stores this snapshot in the cloud storage 140. In one implementation, the hierarchy/report generator 113 may also generate a report for time T2 based on this snapshot. In one implementation, the hierarchy/report generator 113 may compare the snapshot for time T2 with the snapshot for time T1 and generate the report based on the result of this comparison (e.g., as indicated by the dashed lines from the snapshots for times T1 and T2 to the report for time T2). For example, the report may include an indication of the new baseline patterns that appear in the snapshot for time T2 but not in the snapshot for time T1 and/or the difference in the count of occurrences for a given baseline pattern (or a higher level pattern) between the snapshot for time T2 and the snapshot for time T1. This information can help an administrator/user identify any anomalies in the stream of log entries that might indicate a failure in the system 103. In one implementation, the hierarchy/report generator 113 has access to previous snapshots (e.g., stored in cloud storage 140) and can compare any snapshot with one or more previous snapshots. While in the example above a snapshot and report are generated for time T1 and time T2, it is not necessary for a snapshot and/or report to be generated after the processing of each chunk in the queue 120. As described above, the generation of a snapshot and/or report can be performed at other times (e.g., on demand, periodically, and/or at arbitrary times) based on the current set of baseline patterns at that time. For example, the generation of the snapshot and/or report for time T2 could have been skipped, and instead a snapshot and report could be generated at a later time (e.g., time T3) based on the current set of baseline patterns at that later time.

For the sake of illustration, implementations are described herein in the context of analyzing log entries generated by a system. It should be understood, however, that other implementations may analyze other types of structured data in a similar manner, without departing from the spirit and scope of the present disclosure.

FIG. 3 is a diagram illustrating a pattern hierarchy represented in a tree format, according to some implementations. As previously mentioned, a pattern hierarchy 300 can be represented in a tree format as shown in the diagram. As shown in the diagram, the pattern hierarchy 300 includes multiple levels of patterns (i.e., level 1, level 2, and level 3). 1-8 represent raw log entries (where the number corresponds to the log entries shown in box 310 with the same number). Nodes 9-12 are leaf nodes that form level 1 of the pattern hierarchy 300 and represent the baseline patterns that are generated based on one or more of the raw log entries. Nodes 9-12 may correspond to the patterns shown in box 320 with the same number. The log entries represented by 4 and 7 fit the baseline pattern represented by node 9. The log entries represented by 2 and 6 fit the baseline pattern represented by node 10. The log entries represented by 1 and 5 fit the baseline pattern represented by node 11. The log entries represented by 8 and 3 fit the baseline pattern represented by node 12.

Nodes 13 and 14 form level 2 of the pattern hierarchy 300 and represent patterns that are generated based on one or more of the baseline patterns in level 1. Nodes 13 and 14 may correspond to the patterns shown in box 330 with the same number. The pattern represented by node 13 encompasses the baseline patterns represented by nodes 9 and 10. As such, nodes 9 and 10 are children of node 13. The pattern represented by node 14 encompasses the baseline patterns represented by nodes 11 and 12. As such, nodes 11 and 12 are children of node 14. Node 15 forms the root of the pattern hierarchy 300 and represents the most generalized pattern (e.g., generated based on the patterns in level 2). That is, node 15 encompasses the patterns represented by nodes 13 and 14. Node 15 may correspond to the pattern shown in box 340 with the same number. In general, a pattern represented by a parent node encompasses a pattern represented by a child node (and any progeny of the child node).

As previously mentioned, the baseline manager 112 of the log analysis component 110 maintains the current set of baseline patterns. In one implementation, this maintenance involves keeping track of the count of occurrences for each baseline pattern. In this example, the baseline patterns represented by nodes 9, 10, 11, and 12, respectively, each have a count of 2 since each baseline pattern has 2 log entries that fit that baseline pattern. As will be described in additional detail below, as new log entries arrive, the baseline manager 112 may increment the count of occurrences for a baseline pattern (e.g., if a new log entry fits that baseline pattern) and/or add a new baseline pattern (e.g., if a new log entry does not fit any of the existing baseline patterns).

Figure 4A:
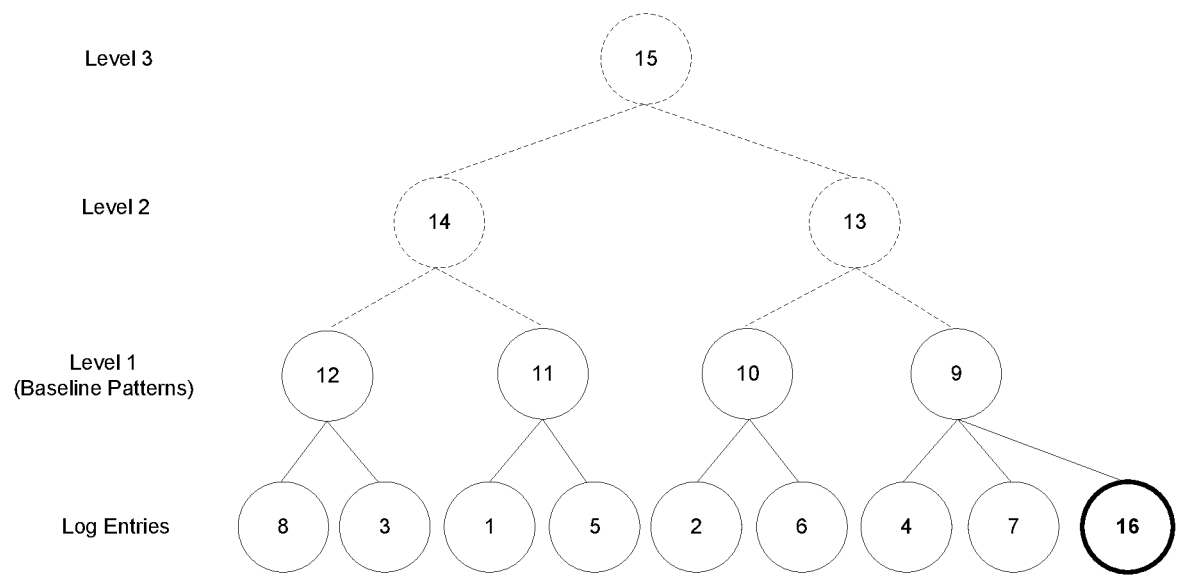
FIG. 4A is a diagram illustrating a scenario where a new log entry fits an existing baseline pattern, according to some implementations.

FIG. 4A is a diagram illustrating a scenario where a new log entry fits an existing baseline pattern, according to some implementations. As previously mentioned, nodes 9-12 represent the baseline patterns. When a new log entry represented by 16 arrives, the baseline manager 112 determines whether the log entry fits any of the existing baseline patterns. In this example, the new log entry 16 fits the baseline pattern represented by node 9. The baseline manager 112 thus increments the count of occurrences for the baseline pattern represented by node 9 from 2 to 3 (since there are now 3 log entries that fit this baseline pattern). In one implementation, the hierarchy/report generator 113 of the log analysis component 110 may update/regenerate the upper levels (e.g., levels 2 and 3) of the pattern hierarchy based on the updated baseline patterns, as needed, to reflect the update to the baseline patterns.

Figure 4B:
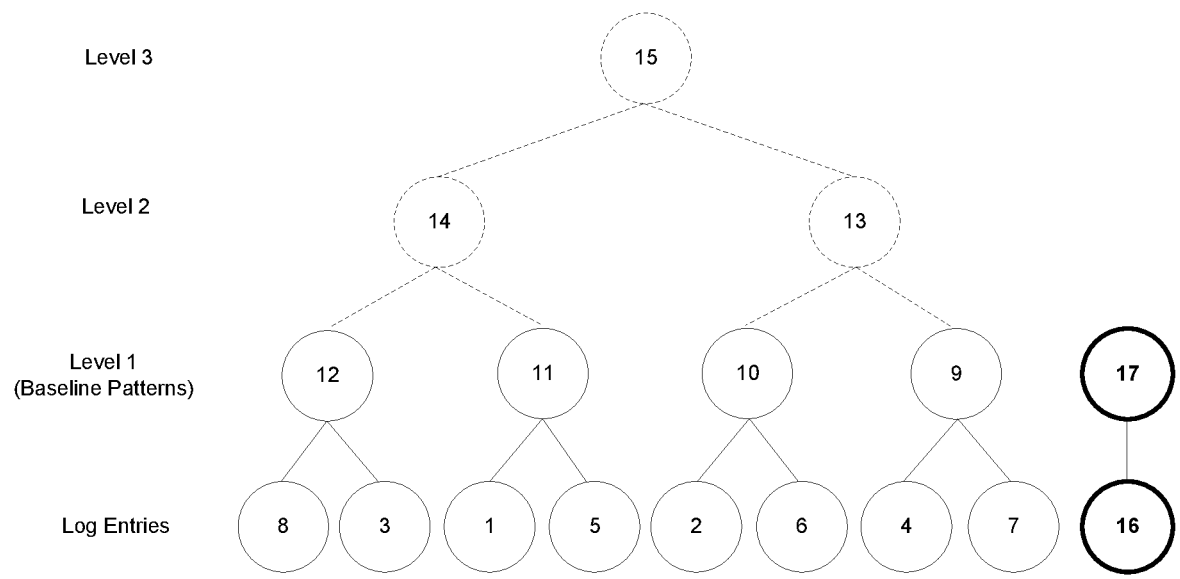
FIG. 4B is a diagram illustrating a scenario where a log entry does not fit any of the existing baseline pattern, according to some implementations.

FIG. 4B is a diagram illustrating a scenario where a log entry does not fit any of the existing baseline patterns, according to some implementations. This scenario is similar to the one described above, except that the log entry represented by 16 does not fit any of the existing baseline patterns. In this example, since the log entry 16 does not fit any of the existing baseline patterns, the baseline manager 112 creates a new baseline pattern represented by node 17 that is added to level 1 of the pattern hierarchy. The count of occurrences for node 17 is set to 1 (since there is 1 log entry that fits this baseline pattern). In one implementation, the hierarchy/report generator 113 of the log analysis component 110 may update/regenerate the upper levels (e.g., levels 2 and 3) of the pattern hierarchy based on the updated baseline patterns, as needed, to reflect the update to the baseline patterns.

FIG. 5 is a diagram illustrating a report, according to some implementations. As shown in the diagram, the report includes a list of log patterns. For each log pattern the report indicates the parent pattern of that log pattern (in the pattern hierarchy), the timestamp of when that log pattern was created (e.g., in terms of date, year, and fiscal year quarter), the level in the pattern h hierarchy for that log pattern, and the count of occurrences for that log pattern.

A dashboard is typically a collection of boxes (often rectangular and referred to as tiles or panels) that often fits on a single webpage or application window (also called a canvas) and that is for display to a user through a user electronic device; in fact, typically a given dashboard is for display to many users through multiple electronic devices. Each box of a dashboard contains a content element (e.g., a chart, a graph, an image (e.g., a color-coded map), a spreadsheet, a pivot table, a list, a table, a widget; some of which are sometimes referred to as a "view" or a "visual") which represents data from a data set (or based thereon). A dashboard and/or one, more, or all of the boxes may include a "menu bar" or other type of display item that allows the user to interact with the dashboard and/or the boxes. A data set is a collection of data used to create a content element, and it can be one data point or data (which may be filtered) from a single data source or data (which may be filtered) from multiple sources (e.g., one or more tables from an Excel workbook, one or more databases (e.g., an SQL database), a website, software services (e.g., Salesforce), etc.).

Figure 6A:
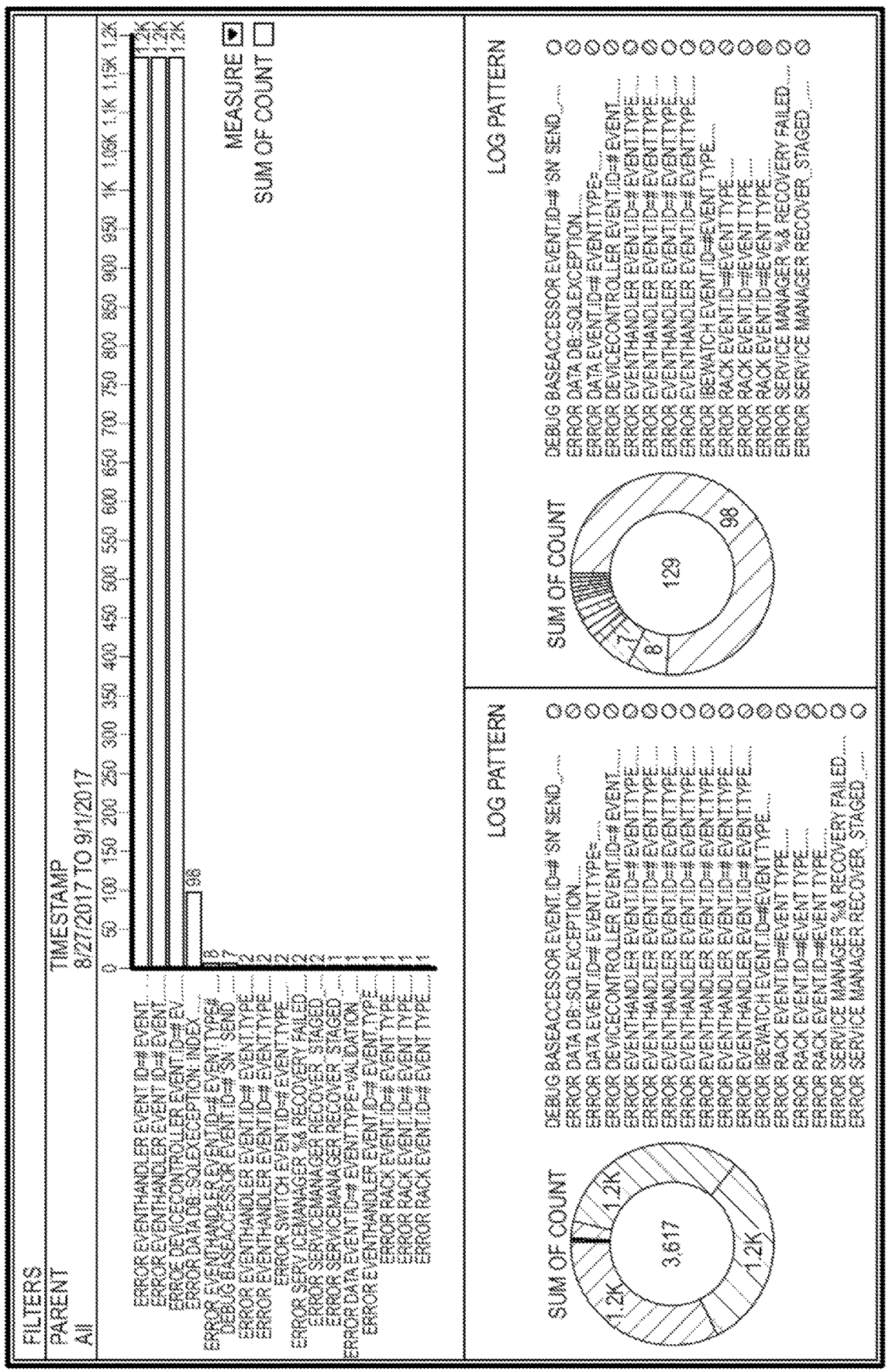
FIG. 6A is a diagram illustrating a reporting dashboard, according to some implementations.

FIG. 6A is a diagram illustrating a reporting dashboard that shows counts of occurrences for patterns, according to some implementations. The reporting dashboard shows a list of patterns and the count of occurrences for each of the patterns. This is represented in a bar graph format, as well as a pie chart format. The reporting dashboard thus provides an administrator/user with a graphical view of the patterns and the count of occurrences for the patterns.

Figure 6B:
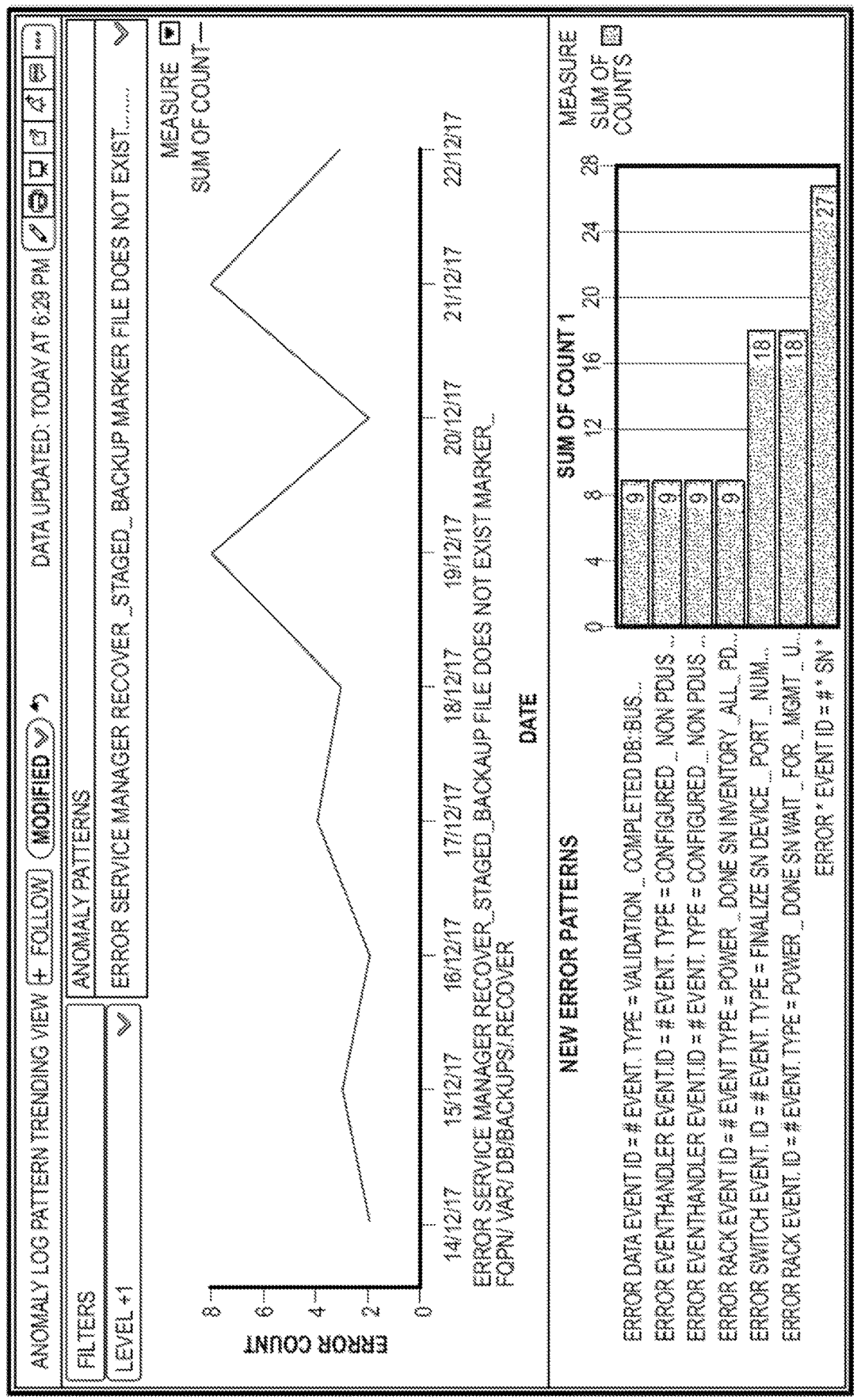
FIG. 6B is a diagram illustrating a reporting dashboard that shows trends and new patterns, according to some implementations.
Figure 6C:
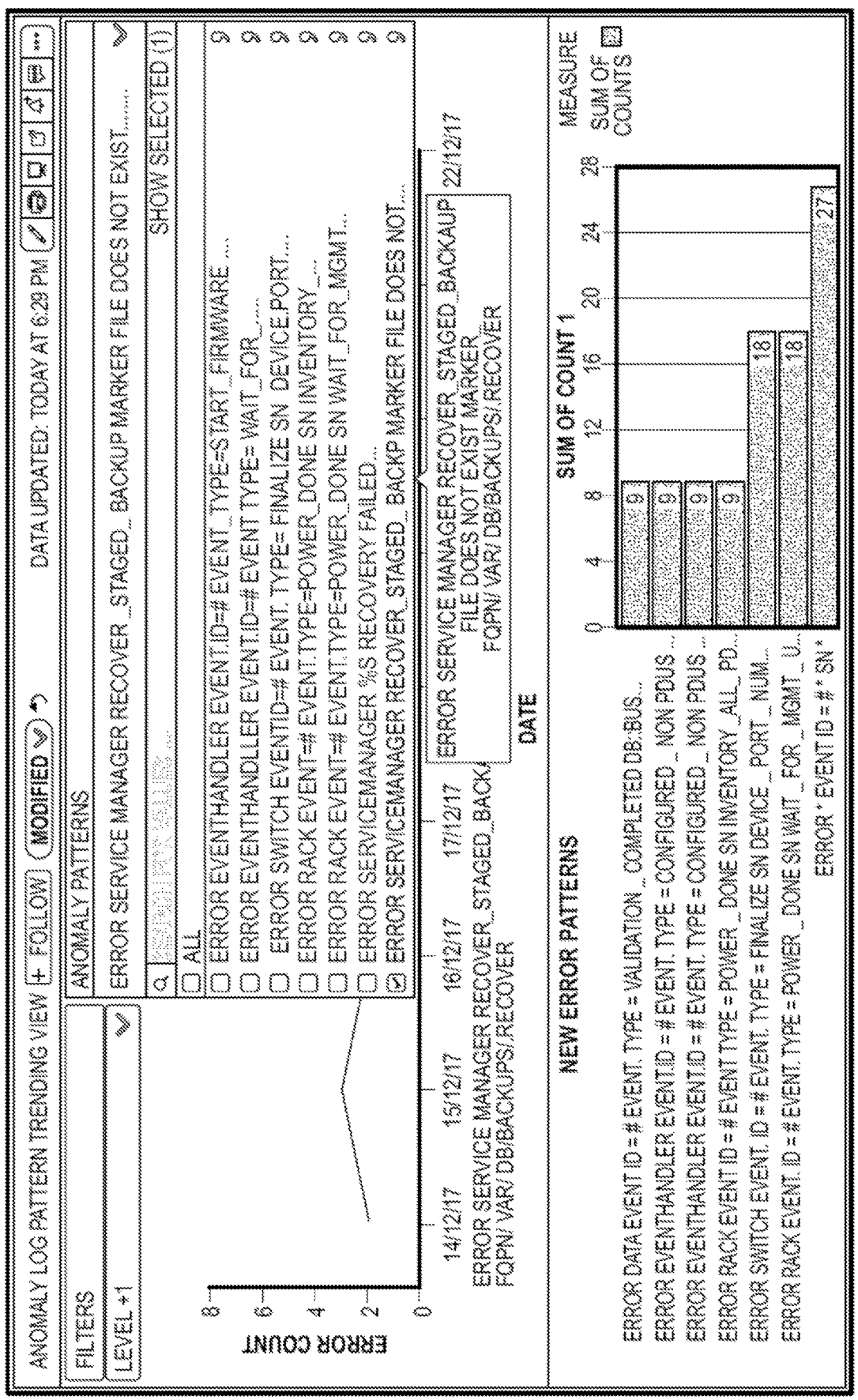
FIG. 6C is a diagram illustrating a user interface provided by the reporting dashboard for selecting one or more patterns, according to some implementations.
Figure 6D:
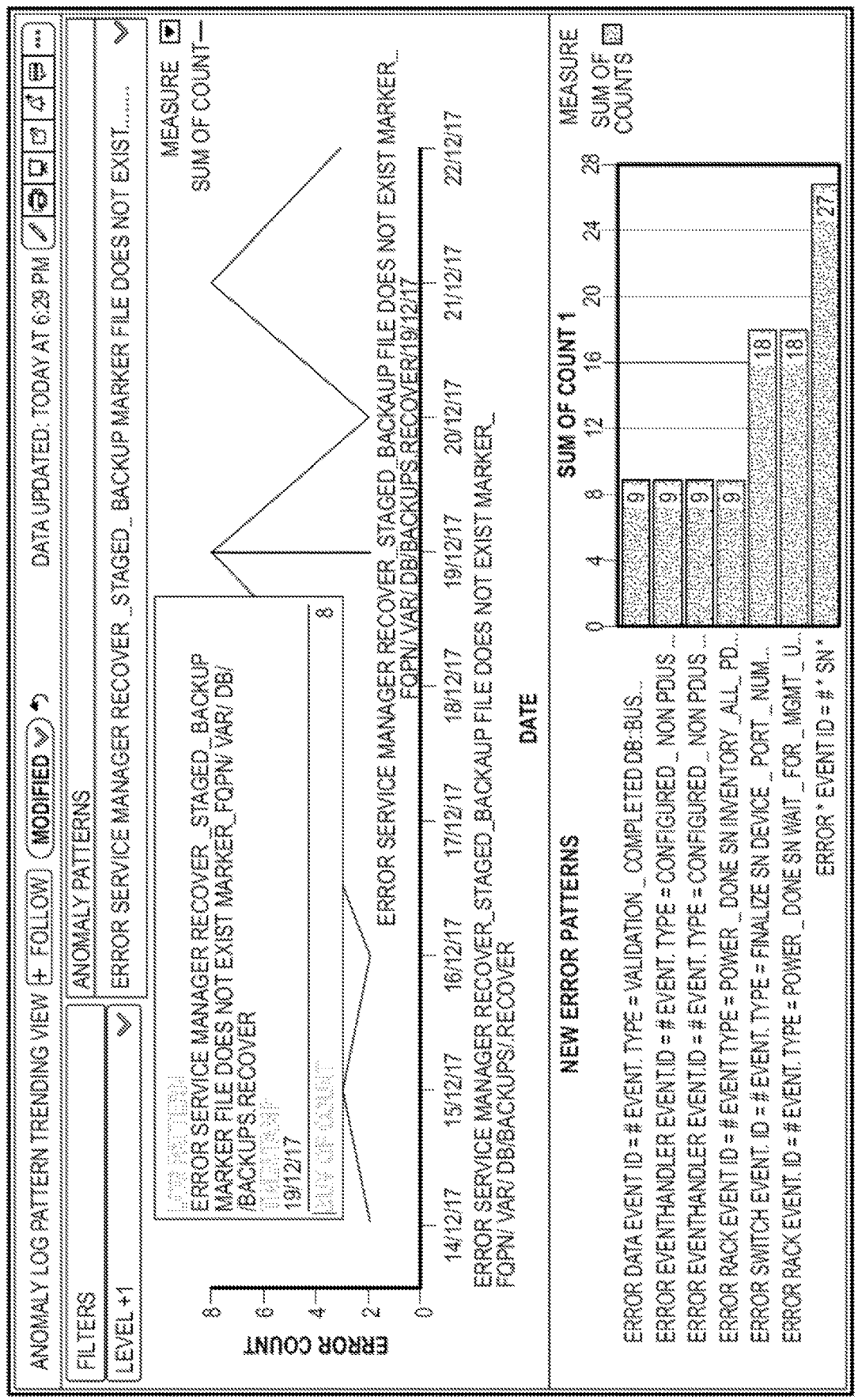
FIG. 6D is a diagram illustrating a user interface provided by the reporting dashboard for displaying additional details regarding a data point shown in the reporting dashboard, according to some implementations.

FIG. 6B is a diagram illustrating a reporting dashboard that shows trends and new patterns, according to some implementations. The graph in the upper portion of the reporting dashboard shows the count of occurrences for a given pattern over a period of time (trending graph). The graph in the bottom portion of the reporting dashboard shows the count of occurrences of new patterns that have appeared (e.g., within the last week). In one implementation, as shown in FIG. 6C, the reporting dashboard provides a dropdown menu (or other type of user interface) that allows a user to select one or more patterns to see the trends for those one or more patterns. For example, if the user selects a pattern from the dropdown menu, the trending graph (the graph in the upper portion of the reporting dashboard) would get updated to show the trends of the selected pattern. In one implementation, the reporting dashboard can provide additional detail regarding particular data points on the graph responsive to user input. For example, as shown in FIG. 6D, if a user hovers over data point for "19/12/17" in the trending graph, the reporting dashboard may display a pop-up bubble that provides additional detail regarding that particular data point (e.g., the full pattern, the time stamp of when that pattern was created, the count of occurrences for that pattern, etc.).

Figure 7:
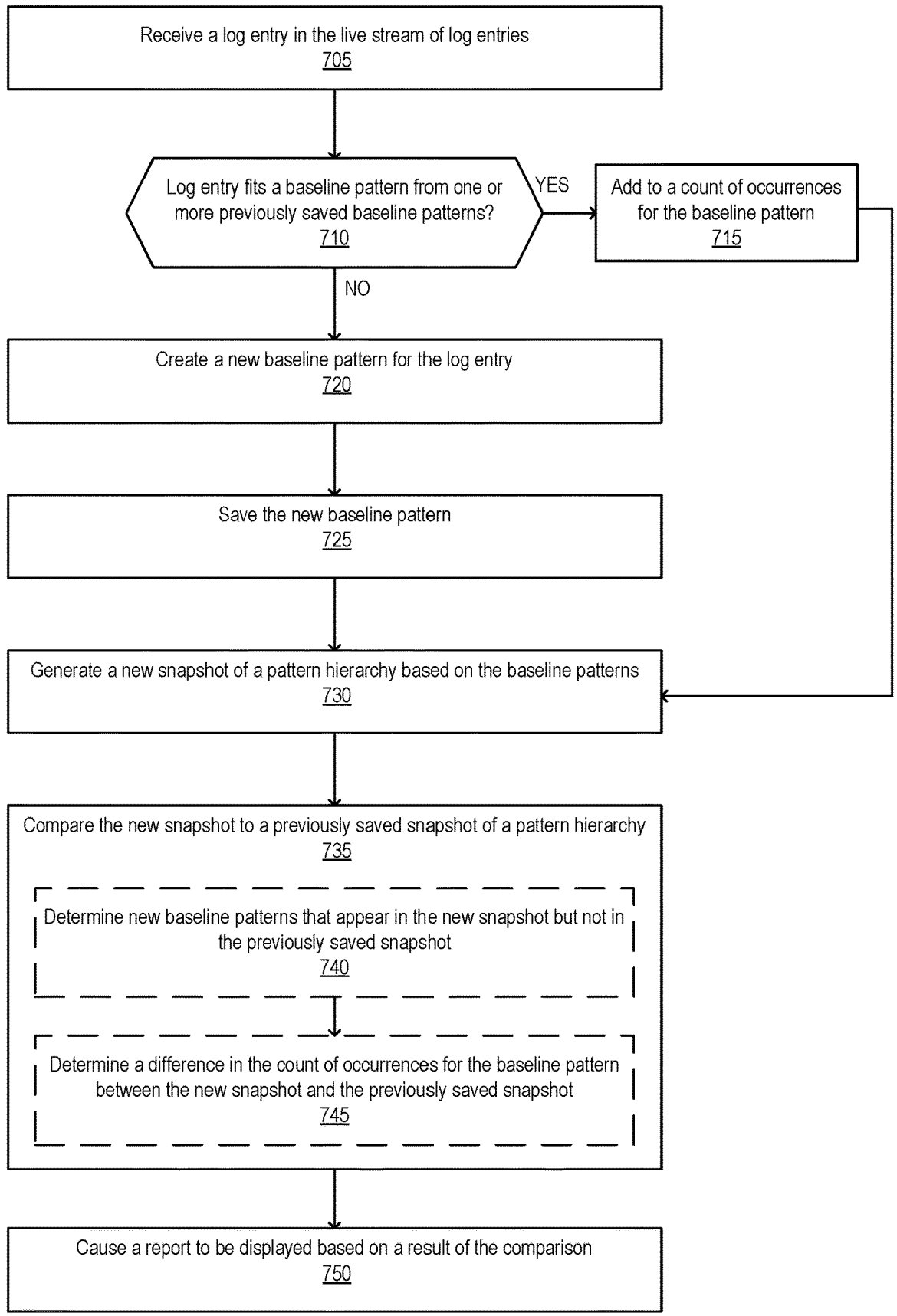
FIG. 7 is a flow diagram of a process for analyzing a live stream of log entries, according to some implementations.

FIG. 7 is a flow diagram of a process for analyzing a live stream of log entries, according to some implementations. In one implementation, the process is performed by a computing device 100 (e.g., implementing the log analysis component 110). The operations in the flow diagrams will be described with reference to the exemplary implementations in the other figures. However, the operations of the flow diagrams can be performed by implementations other than those discussed with reference to the other figures, and the implementations discussed with reference to these other figures can perform operations different than those discussed with reference to the flow diagrams. While the flow diagrams show a particular order of operations performed by certain implementations, it should be understood that such order is exemplary (e.g., alternative implementations may perform the operations in a different order, combine certain operations, overlap certain operations, etc.).

In one implementation, the process is initiated when the computing device 100 receives a log entry in the live stream of log entries (block 705). The computing device 100 determines whether the log entry fits a baseline pattern from any previously saved baseline patterns (decision block 710). If the log entry fits a baseline pattern from the previously saved baseline patterns, then the computing device 100 adds to a count of occurrences for that baseline pattern (block 715). However, if the log entry does not fit any of the previously saved baseline patterns, then the computing device 100 creates a new baseline pattern for the log entry (block 720) and saves the new baseline pattern (e.g., in storage 130) (block 725).

The computing device 100 generates a new snapshot of a pattern hierarchy based on the baseline patterns (block 730) and compares the new snapshot to a previously saved snapshot of a pattern hierarchy (block 735). In one implementation, the comparison includes the computing device 100 determining the new baseline patterns that appear in the new snapshot but not in the previously saved snapshot (block 740) and/or determining a difference in the count of occurrences for the baseline pattern between the new snapshot and the previously saved snapshot (block 745). The computing device 100 then causes a report to be displayed based on a result of the comparison (block 750).

Figure 8:
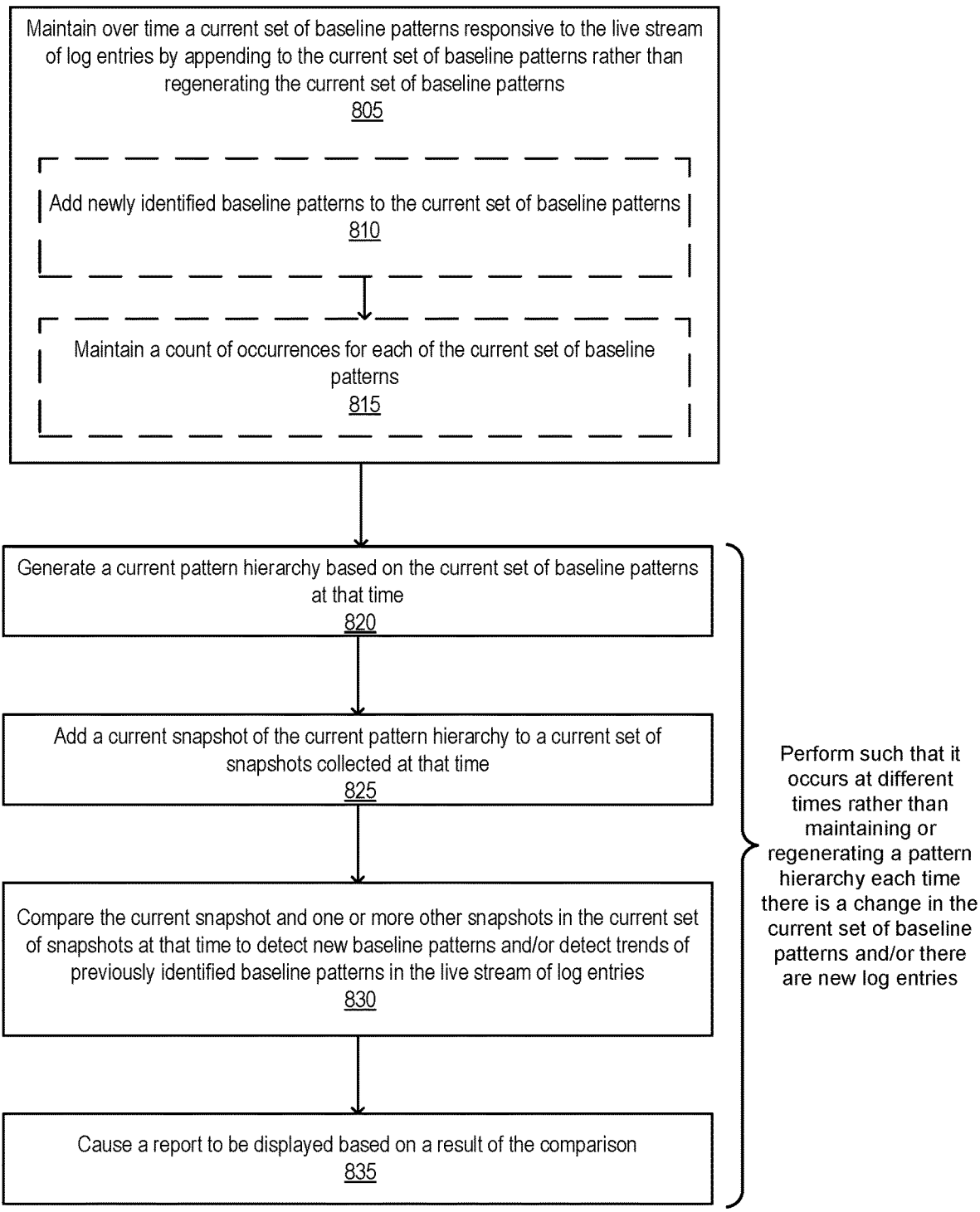
FIG. 8 is a flow diagram of a process for detecting new patterns and/or trends of previously identified patterns in a live stream of log entries, according to some implementations.

FIG. 8 is a flow diagram of a process for detecting new patterns and/or trends of previously identified patterns in a live stream of log entries, according to some implementations. In one implementation, the process is performed by a computing device 100 (e.g., implementing the log analysis component 110).

The computing device 100 maintains, over time, a current set of baseline patterns responsive to the live stream of log entries by appending to the current set of baseline patterns rather than regenerating the current set of baseline patterns (block 805). In one implementation, the maintenance of the current set of baselines includes adding newly identified baseline patterns to the current set of baseline patterns (block 810) and/or maintaining a count of occurrences for each of the current set of baseline patterns (block 815) (e.g., similar to the operations of blocks 710-725 in FIG. 7).

The computing device 100 then performs blocks 820-835 such that it occurs at different times rather than maintaining or regenerating a pattern hierarchy each time there is a change in the current set of baseline patterns and/or there are new log entries: 1) the computing device 100 generates a current pattern hierarchy based on the current set of baseline patterns at that time (block 820); 2) the computing device 100 adds a current snapshot of the current pattern hierarchy to a current set of snapshots collected at that time (block 825); 3) the computing device 100 compares the current snapshot and one or more other snapshots in the current set of snapshots at that time to detect new baseline patterns and/or detect trends of previously identified baseline patterns in the live stream of log entries (block 830); and 4) the computing device 100 causes a report to be displayed based on a result of the comparison (block 835).

One or more parts of the above implementations may include software and/or a combination of software and hardware. An electronic device (also referred to as a computing device, computer, etc.) includes hardware and software, such as a set of one or more processors coupled to one or more machine-readable storage media (e.g., magnetic disks, optical disks, read only memory (ROM), Flash memory, phase change memory, solid state drives (SSDs)) to store code (which is composed of software instructions and which is sometimes referred to as computer program code or a computer program) for execution on the set of processors and/or to store data. For instance, an electronic device may include non-volatile memory (with slower read/write times, e.g., magnetic disks, optical disks, read only memory (ROM), Flash memory, phase change memory, SSDs) and volatile memory (e.g., dynamic random access memory (DRAM), static random access memory (SRAM)), where the non-volatile memory persists code/data even when the electronic device is turned off or when power is otherwise removed, and the electronic device copies that part of the code that is to be executed by the set of processors of that electronic device from the non-volatile memory into the volatile memory of that electronic device during operation because volatile memory typically has faster read/write times. As another example, an electronic device may include a non-volatile memory (e.g., phase change memory) that persists code/data when the electronic device is turned off, and that has sufficiently fast read/write times such that, rather than copying the part of the code/data to be executed into volatile memory, the code/data may be provided directly to the set of processors (e.g., loaded into a cache of the set of processors); in other words, this non-volatile memory operates as both long term storage and main memory, and thus the electronic device may have no or only a small amount of volatile memory for main memory. In addition to storing code and/or data on machine-readable storage media, typical electronic devices can transmit code and/or data over one or more machine-readable transmission media (also called a carrier) (e.g., electrical, optical, radio, acoustical or other form of propagated signals—such as carrier waves, infrared signals). For instance, typical electronic devices also include a set of one or more physical network interface(s) to establish network connections (to transmit and/or receive code and/or data using propagating signals) with other electronic devices. Thus, an electronic device may store and transmit (internally and/or with other electronic devices over a network) code and/or data with one or more machine-readable media (also referred to as computer-readable media).

Electronic devices are used for a variety of purposes. For example, an electronic device (sometimes referred to as a server electronic device) may execute code that cause it to operate as one or more servers used to provide a service to another electronic device(s) (sometimes referred to as a client electronic device, a client computing device, or a client device) that executes client software (sometimes referred to as client code or an end user client) to communicate with the service. The server and client electronic devices may be operated by users respectively in the roles of administrator (also known as an administrative user) and end user.

The term "user" is a generic term referring to an entity (e.g., an individual person) using a system and/or service. A multi-tenant architecture provides each tenant with a dedicated share of a software instance and the ability (typically) to input tenant specific data for user management, tenant-specific functionality, configuration, customizations, non-functional properties, associated applications, etc. Multi-tenancy contrasts with multi-instance architectures, where separate software instances operate on behalf of different tenants. A tenant includes a group of users who share a common access with specific privileges to a software instance providing a service. A tenant may be an organization (e.g., a company, department within a company, etc.). A tenant may have one or more roles relative to a system and/or service. For example, in the context of a customer relationship management (CRM) system or service, a tenant may be a vendor using the CRM system or service to manage information the tenant has regarding one or more customers of the vendor. As another example, in the context of Data as a Service (DAAS), one set of tenants may be vendors providing data and another set of tenants may be customers of different ones or all of the vendors' data. As another example, in the context of Platform as a Service (PAAS), one set of tenants may be third party application developers providing applications/services and another set of tenants may be customers of different ones or all of the third-party application developers. A user may have one or more roles relative to a system and/or service. To provide some examples, a user may be a representative (sometimes referred to as an "end user") of a tenant (e.g., a vendor or customer), a representative (e.g., an administrator) of the company providing the system and/or service, and/or a representative (e.g., a programmer) of a third-party application developer that is creating and maintaining an application(s) on a Platform as a Service (PAAS).

Figure 9A:
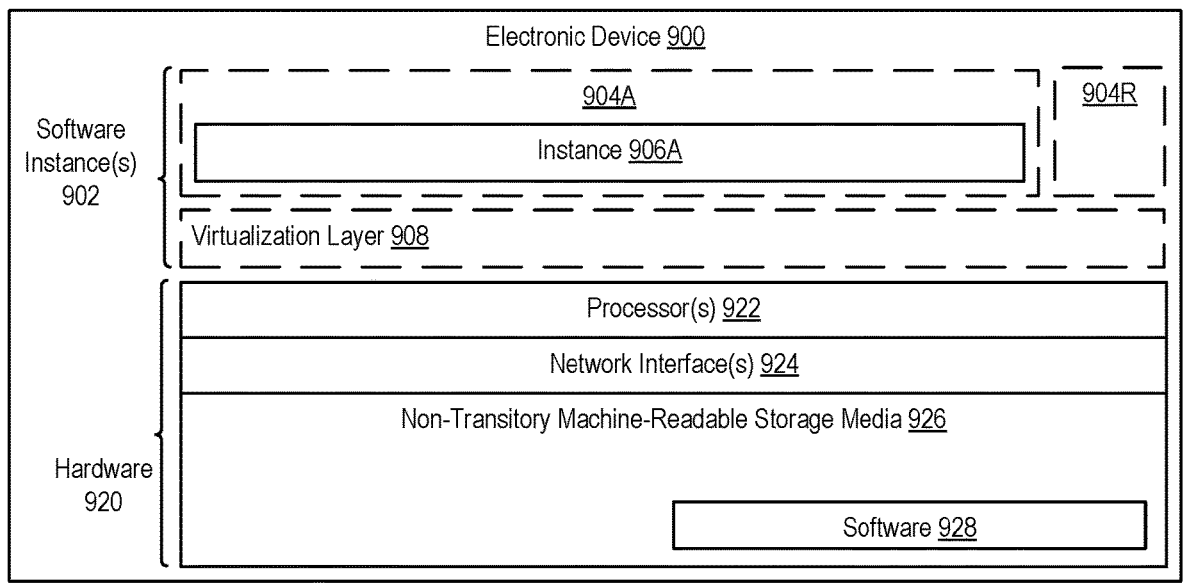
FIG. 9A is a block diagram illustrating an electronic device according to some example implementations.

FIG. 9A is a block diagram illustrating an electronic device 900 according to some example implementations. FIG. 9A includes hardware 920 comprising a set of one or more processor(s) 922, a set of one or more network interfaces 924 (wireless and/or wired), and non-transitory machine-readable storage media 926 having stored therein software 928 (which includes instructions executable by the set of one or more processor(s) 922). The previously described computing device 100 and log analysis service (e.g., provided by the log analysis component 110 of the computing device 100) may be implemented in one or more electronic devices 900. In one implementation: 1) each of the end user clients is implemented in a separate one of the electronic devices 900 (e.g., in user electronic devices operated by users where the software 928 represents the software to implement end user clients to interface with the log analysis service (e.g., a web browser, a native client, a portal, a command-line interface, and/or an application program interface (API) based upon protocols such as Simple Object Access Protocol (SOAP), Representational State Transfer (REST), etc.)); 2) the log analysis service is implemented in a separate set of one or more of the electronic devices 900 (e.g., a set of one or more server electronic devices where the software 928 represents the software to implement the log analysis service); and 3) in operation, the electronic devices implementing the end user clients and the log analysis service would be communicatively coupled (e.g., by a network) and would establish between them (or through one or more other layers) connections for submitting requests for log analysis to the log analysis service and returning results of the log analysis (e.g., in the form of a report or reporting dashboard 150) to the end user clients. Other configurations of electronic devices may be used in other implementations (e.g., an implementation in which the end user client and the log analysis service are implemented on a single electronic device 900).

In electronic devices that use compute virtualization, the set of one or more processor(s) 922 typically execute software to instantiate a virtualization layer 908 and software container(s) 904A-R (e.g., with operating system-level virtualization, the virtualization layer 908 represents the kernel of an operating system (or a shim executing on a base operating system) that allows for the creation of multiple software containers 904A-R (representing separate user space instances and also called virtualization engines, virtual private servers, or jails) that may each be used to execute a set of one or more applications; with full virtualization, the virtualization layer 908 represents a hypervisor (sometimes referred to as a virtual machine monitor (VMM)) or a hypervisor executing on top of a host operating system, and the software containers 904A-R each represent a tightly isolated form of a software container called a virtual machine that is run by the hypervisor and may include a guest operating system; with para-virtualization, an operating system or application running with a virtual machine may be aware of the presence of virtualization for optimization purposes). Again, in electronic devices where compute virtualization is used, during operation an instance of the software 928 (illustrated as instance 906A) is executed within the software container 904A on the virtualization layer 908. In electronic devices where compute virtualization is not used, the instance 906A on top of a host operating system is executed on the "bare metal" electronic device 900. The instantiation of the instance 906A, as well as the virtualization layer 908 and software containers 904A-R if implemented, are collectively referred to as software instance(s) 902.

Alternative implementations of an electronic device may have numerous variations from that described above. For example, customized hardware and/or accelerators might also be used in an electronic device.

Figure 9B:
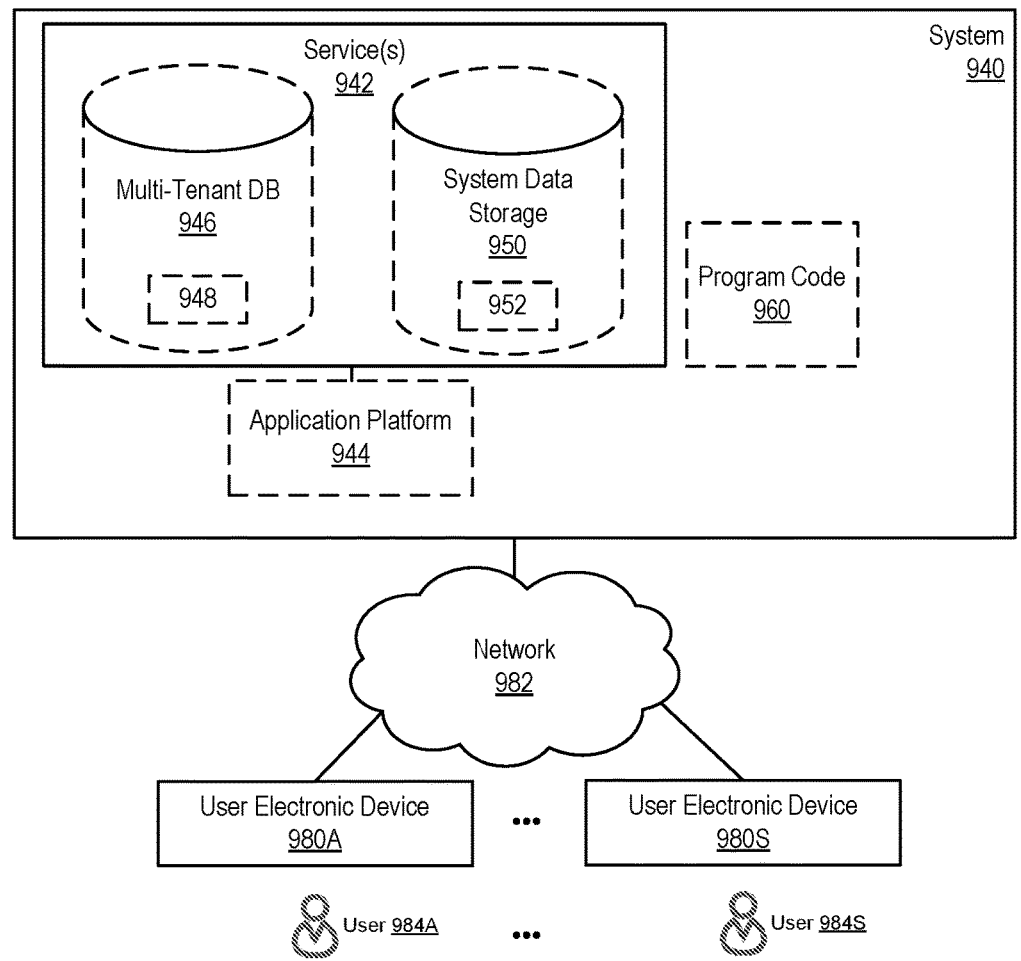
FIG. 9B is a block diagram of an environment where a log analysis service may be deployed, according to some implementations.

FIG. 9B is a block diagram of an environment where a log analysis service may be deployed, according to some implementations. A system 940 includes hardware (a set of one or more electronic devices) and software to provide service(s) 942, including the log analysis service. The system 940 is coupled to user electronic devices 980A-S over a network 982. The service(s) 942 may be on-demand services that are made available to one or more of the users 984A-S working for one or more other organizations (sometimes referred to as outside users) so that those organizations do not need to necessarily be concerned with building and/or maintaining a system, but instead makes use of the service(s) 942 when needed (e.g., on the demand of the users 984A-S). The service(s) 942 may communication with each other and/or with one or more of the user electronic devices 980A-S via one or more Application Programming Interface(s) (APIs) (e.g., a Representational State Transfer (REST) API). The user electronic devices 980A-S are operated by users 984A-S.

In one implementation, the system 940 is a multi-tenant cloud computing architecture supporting multiple services, such as a customer relationship management (CRM) service (e.g., Sales Cloud by salesforce.com, Inc.), a contracts/proposals/quotes service (e.g., Salesforce CPQ by salesforce.com, Inc.), a customer support service (e.g., Service Cloud and Field Service Lightning by salesforce.com, Inc.), a marketing service (e.g., Marketing Cloud, Salesforce DMP, and Pardot by salesforce.com, Inc.), a commerce service (e.g., Commerce Cloud Digital, Commerce Cloud Order Management, and Commerce Cloud Store by salesforce.com, Inc.), communication with external business data sources (e.g., Salesforce Connect by salesforce.com, Inc.), a productivity service (e.g., Quip by salesforce.com, Inc.), database as a service (e.g., Database.com™ by salesforce.com, Inc.), Data as a Service (DAAS) (e.g., Data.com by salesforce.com, Inc.), Platform as a Service (PAAS) (e.g., execution runtime and application (app) development tools; such as, Heroku™ Enterprise, Thunder, and Force.com® and Lightning by salesforce.com, Inc.), an analytics service (e.g., Einstein Analytics, Sales Analytics, and/or Service Analytics by salesforce.com, Inc.), a community service (e.g., Community Cloud and Chatter by salesforce.com, Inc.), an Internet of Things (IoT) service (e.g., Salesforce IoT and IoT Cloud by salesforce.com, Inc.), industry specific services (e.g., Financial Services Cloud and Health Cloud by salesforce.com, Inc.), and/or Infrastructure as a Service (IAAS) (e.g., virtual machines, servers, and/or storage). For example, system 940 may include an application platform 944 that enables PAAS for creating, managing, and executing one or more applications developed by the provider of the application platform 944, users accessing the system 940 via one or more of user electronic devices 980A-S, or third-party application developers accessing the system 940 via one or more of user electronic devices 980A-S.

In some implementations, one or more of the service(s) 942 may utilize one or more multi-tenant databases 946, as well as system data storage 950 for system data 952 accessible to system 940. In certain implementations, the system 940 includes a set of one or more servers that are running on server electronic devices and that are configured to handle requests for any authorized user associated with any tenant (there is no server affinity for a user and/or tenant to a specific server). The user electronic device 980A-S communicate with the server(s) of system 940 to request and update tenant-level data and system-level data hosted by system 940, and in response the system 940 (e.g., one or more servers in system 940) automatically may generate one or more Structured Query Language (SQL) statements (e.g., one or more SQL queries) that are designed to access the desired information from the one or more multi-tenant database 946 and/or system data storage 950.

In some implementations, the service(s) 942 are implemented using virtual applications dynamically created at run time responsive to queries from the user electronic devices 980A-S and in accordance with metadata, including: 1) metadata that describes constructs (e.g., forms, reports, workflows, user access privileges, business logic) that are common to multiple tenants; and/or 2) metadata that is tenant specific and describes tenant specific constructs (e.g., tables, reports, dashboards, interfaces, etc.) and is stored in a multi-tenant database. To that end, the program code 960 may be a runtime engine that materializes application data from the metadata; that is, there is a clear separation of the compiled runtime engine (also known as the system kernel), tenant data, and the metadata, which makes it possible to independently update the system kernel and tenant-specific applications and schemas, with virtually no risk of one affecting the others. Further, in one implementation, the application platform 944 includes an application setup mechanism that supports application developers' creation and management of applications, which may be saved as metadata by save routines. Invocations to such applications, including the log analysis service, may be coded using Procedural Language/Structured Object Query Language (PL/SOQL) that provides a programming language style interface. A detailed description of some PL/SOQL language implementations is discussed in U.S. Pat. No. 7,730,478 entitled, METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007. Invocations to applications may be detected by one or more system processes, which manages retrieving application metadata for the tenant making the invocation and executing the metadata as an application in a software container (e.g., a virtual machine).

Network 982 may be any one or any combination of a LAN (local area network), WAN (wide area network), telephone network, wireless network, point-to-point network, star network, token ring network, hub network, or other appropriate configuration. The network may comply with one or more network protocols, including an Institute of Electrical and Electronics Engineers (IEEE) protocol, a 3rd Generation Partnership Project (3GPP) protocol, or similar wired and/or wireless protocols, and may include one or more intermediary devices for routing data between the system 940 and the user electronic devices 980A-S.

Each user electronic device 980A-S (such as a desktop personal computer, workstation, laptop, Personal Digital Assistant (PDA), smart phone, etc.) typically includes one or more user interface devices, such as a keyboard, a mouse, a trackball, a touch pad, a touch screen, a pen or the like, for interacting with a graphical user interface (GUI) provided on a display (e.g., a monitor screen, a liquid crystal display (LCD), etc.) in conjunction with pages, forms, applications and other information provided by system 940. For example, the user interface device can be used to access data and applications hosted by system 940, and to perform searches on stored data, and otherwise allow a user 984 to interact with various GUI pages that may be presented to a user 984. User electronic devices 980A-S might communicate with system 940 using TCP/IP (Transfer Control Protocol and Internet Protocol) and, at a higher network level, use other networking protocols to communicate, such as Hypertext Transfer Protocol (HTTP), FTP, Andrew File System (AFS), Wireless Application Protocol (WAP), File Transfer Protocol (FTP), Network File System (NFS), an application program interface (API) based upon protocols such as Simple Object Access Protocol (SOAP), Representational State Transfer (REST), etc. In an example where HTTP is used, one or more user electronic devices 980A-S might include an HTTP client, commonly referred to as a "browser," for sending and receiving HTTP messages to and from server(s) of system 940, thus allowing users 984 of the user electronic device 980A-S to access, process and view information, pages and applications available to it from system 940 over network 982.

In the above description, numerous specific details such as resource partitioning/sharing/duplication implementations, types and interrelationships of system components, and logic partitioning/integration choices are set forth in order to provide a more thorough understanding. It will be appreciated, however, by one skilled in the art, that the invention may be practiced without such specific details. In other instances, control structures, logic implementations, opcodes, means to specify operands, and full software instruction sequences have not been shown in detail since those of ordinary skill in the art, with the included descriptions, will be able to implement what is described without undue experimentation.

References in the specification to "one implementation," "an implementation," "an example implementation," etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to affect such feature, structure, or characteristic in connection with other implementations whether or not explicitly described.

Bracketed text and blocks with dashed borders (e.g., large dashes, small dashes, dot-dash, and dots) may be used herein to illustrate optional operations and/or structures that add additional features to some implementations. However, such notation should not be taken to mean that these are the only options or optional operations, and/or that blocks with solid borders are not optional in certain implementations.

In the following description and claims, the term "coupled," along with its derivatives, may be used. "Coupled" is used to indicate that two or more elements, which may or may not be in direct physical or electrical contact with each other, co-operate or interact with each other.

The operations in the flow diagrams are be described with reference to the exemplary implementations in the other figures. However, the operations of the flow diagrams can be performed by implementations other than those discussed with reference to the other figures, and the implementations discussed with reference to these other figures can perform operations different than those discussed with reference to the flow diagrams.

While the flow diagrams in the figures show a particular order of operations performed by certain implementations, it should be understood that such order is exemplary (e.g., alternative implementations may perform the operations in a different order, combine certain operations, overlap certain operations, etc.).

While the above description includes several exemplary implementations, those skilled in the art will recognize that the invention is not limited to the implementations described and can be practiced with modification and alteration within the spirit and scope of the appended claims. The description is thus illustrative instead of limiting.

What is claimed is:

1. A method by a computing device to analyze a live stream of log entries generated by a system to determine at least one or more of new patterns and changes in a number of occurrences of previously identified patterns, the method comprising:

receiving a log entry in the live stream of log entries;
determining whether the log entry fits a baseline pattern from one or more currently saved baseline patterns;
updating the one or more currently saved baseline patterns by adding to a count of occurrences for the baseline pattern responsive to a determination that the log entry fits the baseline pattern or creating a new baseline pattern for the log entry and saving the new baseline pattern responsive to a determination that the log entry does not fit any of the one or more currently saved baseline patterns;
generating a first pattern hierarchy based on the updated baseline patterns, wherein the pattern hierarchy includes a plurality of levels of patterns with patterns in a higher level of the plurality of levels being more general than patterns in a lower level of the plurality of levels, the updated baseline patterns forming a lowest level of the plurality of levels of patterns and each of the updated baseline patterns representing a cluster of log entries that have been determined by a clustering algorithm to be textually similar;
comparing the first pattern hierarchy to a second pattern hierarchy, wherein the second pattern hierarchy was previously generated based on a version of the currently saved baseline patterns that existed at the time that the second pattern hierarchy was generated; and
causing a report to be displayed based on a result of the comparing.

2. The method of claim 1, wherein the live stream of log entries includes log entries generated by a datacenter that are indicative of failures in the datacenter.

3. The method of claim 1, wherein the report includes an indication of which baseline pattern has the highest count of occurrences.

4. The method of claim 1, wherein the comparing includes determining new baseline patterns that appear in the first pattern hierarchy but not in the second pattern hierarchy, and wherein the report includes an indication of the new baseline patterns.

5. The method of claim 1, wherein the comparing includes determining a difference in the count of occurrences for the baseline pattern between the first pattern hierarchy and the second pattern hierarchy, and wherein the report includes an indication of the difference in the count of occurrences.

6. The method of claim 1, wherein the updated baseline patterns are generated based on running the clustering algorithm and a pattern recognition algorithm on the live stream of log entries.

7. The method of claim 1, wherein one or more patterns in a given level of the plurality of levels are generated based on the one or more patterns in a level immediately below the given level.

8. A method by a computing device to detect new patterns and/or trends of previously identified patterns in a live stream of log entries generated by a system, the method comprising:

maintaining over time a current set of baseline patterns responsive to the live stream of log entries by appending to the current set of baseline patterns rather than regenerating the current set of baseline patterns; and
performing the following such that it occurs at different times rather than maintaining or regenerating a pattern hierarchy each time there is a change in the current set of baseline patterns and/or there are new log entries,
generating a current pattern hierarchy based on the current set of baseline patterns at that time, wherein the current pattern hierarchy includes a plurality of levels of patterns with patterns in a higher level of the plurality of levels being more general than patterns in a lower level of the plurality of levels, the current set of baseline patterns at that time forming a lowest level of the plurality of levels of patterns and each baseline pattern in the current set of baseline patterns representing a cluster of log entries that have been determined by a clustering algorithm to be textually similar, adding the current pattern hierarchy to a current set of pattern hierarchies collected at that time, comparing the current pattern hierarchy and one or more other pattern hierarchies in the current set of pattern hierarchies at that time to detect new baseline patterns and/or detect trends of previously identified baseline patterns in the live stream of log entries, wherein the one or more other pattern hierarchies were previously generated based on a version of the current set of baseline patterns that existed at the time that respective ones of the one or more other pattern hierarchies were generated and causing a report to be displayed based on a result of the comparing.

9. The method of claim 8, wherein the maintaining includes:

adding newly identified baseline patterns to the current set of baseline patterns and maintaining a count of occurrences for each of the current set of baseline patterns.

10. A computing device configured to analyze a live stream of log entries generated by a system to determine at least one or more of new patterns and changes in a number of occurrences of previously identified patterns, the computing device comprising:

one or more processors; and a non-transitory machine-readable storage medium having instructions stored therein, which when executed by the one or more processors, causes the computing device to:

receive a log entry in the live stream of log entries;

determine whether the log entry fits a baseline pattern from one or more currently saved baseline patterns;

update the one or more currently saved baseline patterns by adding to a count of occurrences for the baseline pattern responsive to a determination that the log entry fits the baseline pattern or creating a new baseline pattern for the log entry and saving the new baseline pattern responsive to a determination that the log entry does not fit any of the one or more currently saved baseline patterns;

generate a first pattern hierarchy based on the updated baseline patterns, wherein the pattern hierarchy includes a plurality of levels of patterns with patterns in a higher level of the plurality of levels being more general than patterns in a lower level of the plurality of levels, the updated baseline patterns forming a lowest level of the plurality of levels of patterns and each of the updated baseline patterns representing a cluster of log entries that have been determined by a clustering algorithm to be textually similar;

compare the first pattern hierarchy to a second pattern hierarchy, wherein the second pattern hierarchy was previously generated based on a version of the currently saved baseline patterns that existed at the time that the second pattern hierarchy was generated; and cause a report to be displayed based on a result of the comparing.

11. The computing device of claim 10, wherein the live stream of log entries includes log entries generated by a datacenter that are indicative of failures in the datacenter.

12. The computing device of claim 10, wherein the report includes an indication of which baseline pattern has the highest count of occurrences.

13. The computing device of claim 10, wherein the comparing includes determining new baseline patterns that appear in the first pattern hierarchy but not in the second pattern hierarchy, and wherein the report includes an indication of the new baseline patterns.

14. The computing device of claim 10, wherein the comparing includes determining a difference in the count of occurrences for the baseline pattern between the first pattern hierarchy and the second pattern hierarchy, and wherein the report includes an indication of the difference in the count of occurrences.

15. A non-transitory machine-readable storage medium having instructions stored therein, which when executed by one or more processors of a computing device, causes the computing device to perform operations for detecting new patterns and/or trends of previously identified patterns in a live stream of log entries generated by a system, the operations comprising:

maintaining over time a current set of baseline patterns responsive to the live stream of log entries by appending to the current set of baseline patterns rather than regenerating the current set of baseline patterns; and performing the following such that it occurs at different times rather than maintaining or regenerating a pattern hierarchy each time there is a change in the current set of baseline patterns, generating a current pattern hierarchy based on the current set of baseline patterns at that time, wherein the current pattern hierarchy includes a plurality of levels of patterns with patterns in a higher level of the plurality of levels being more general than patterns in a lower level of the plurality of levels, the current set of baseline patterns at that time forming a lowest level of the plurality of levels of patterns and each baseline pattern in the current set of baseline patterns representing a cluster of log entries that have been determined by a clustering algorithm to be textually similar, adding the current pattern hierarchy to a current set of pattern hierarchies collected at that time, comparing the current pattern hierarchy and one or more other pattern hierarchies in the current set of pattern hierarchies at that time to detect new baseline patterns and/or detect trends of previously identified baseline patterns in the live stream of log entries, wherein the one or more other pattern hierarchies were previously generated based on a version of the current set of baseline patterns that existed at the time that respective ones of the one or more other pattern hierarchies were generated and causing a report to be displayed based on a result of the comparing.

16. The non-transitory machine-readable storage medium of claim 15, wherein the maintaining includes:

adding newly identified baseline patterns to the current set of baseline patterns and maintaining a count of occurrences for each of the current set of baseline patterns.

* * * * *